Nov. 15, 1966  R. KOMPFNER ETAL  3,285,129
TRIPLE ELEMENT S-LENS FOCUSING SYSTEM
Filed June 12, 1963  2 Sheets-Sheet 1

INVENTORS R. KOMPFNER
E. A. J. MARCATILI
BY Kenneth W. Mateu
ATTORNEY

Nov. 15, 1966   R. KOMPFNER ETAL   3,285,129
TRIPLE ELEMENT S-LENS FOCUSING SYSTEM
Filed June 12, 1963   2 Sheets-Sheet 2

3,285,129
TRIPLE ELEMENT S-LENS FOCUSING SYSTEM

Rudolf Kompfner, Middletown, and Enrique A. J. Marcatili, Fair Haven, N.J., assignors to Bell Telephone Laboratories, Incorporated, New York, N.Y., a corporation of New York
Filed June 12, 1963, Ser. No. 287,420
10 Claims. (Cl. 88—57)

This invention relates to optical frequency communication systems, and, more particularly, to focusing apparatus for use in such systems.

The recent advent of the optical maser, together with the many embodiments thereof, has stimulated wide interest in the potentialities of wideband communication systems utilizing modulated energy beams in the infrared, visible, and ultra violet portions of the electromagnetic spectrum.

Attendant such interest has come the realization that many of the techniques heretofore conventional in their communications applications are no longer feasible at the frequencies of interest. One such group of techniques pertains to the guiding medium itself. A particularly attractive arrangement for efficiently guiding coherent electromagnetic wave energy having wavelengths between $10^{-1}$ and $10^{-6}$ centimeters from point to point comprises a cylindrical tube which is known descriptively as a "light pipe." Since however, diffraction effects cause an electromagnetic wave energy beam to spread in physical extent as a function of distance traveled, periodic beam refocusing will be required to maintain the beam diameter below the desired maximum. Appropriate focusing devices can comprise various arrangements of energy reflectors, prisms, and lenses, or a combination of such elements.

As disclosed in the copending application of R. Kompfner, Serial No. 161,591 filed December 22, 1961, assigned to the assignee of this application, and issued as U.S. Patent 3,224,331 on December 21, 1965, one particularly attractive focusing arrangement comprises a warped dielectric sheet having sinusoidal or near sinusoidal surface curvature. Such an arrangement is known descriptively as an "S" sheet, and a combination of such sheets into a focusing device is known as an S-lens. Each surface of the component S-sheets is a cylindrical surface whose generator is always parallel to a given axis of a three dimensional Cartesian coordinate system. As disclosed in detail in the above copending application, an S-sheet is characterized by long focal length, low internal loss, and low reflection loss. The S-sheet configuration serves to focus incident light in one plane only, and therefore defines an associated focal line rather than a focal point. Additionally, the Kompfner application discloses the combination of two orthogonally related S-sheets as an S-lens for communication purposes. It has been found however, that the aberrations inherent in such a two element arrangement are too severe for some optical communication applications.

It is therefore the object of the present invention to improve the performance of multiple S-sheet lens arrangements.

It is a more specific object of the invention to reduce beam aberrations in multiple S-sheet lens arrangements.

In accordance with the invention three S-sheets are combined into an S-lens having point focusing properties and low associated aberration. A first of the three S-sheets acts as a single sheet lens and provides beam focusing along a line parallel to the magnetic vector of incident plane polarized optical wave energy. The second and third of the three S-sheets act together as a double sheet lens and provide beam focusing along a line parallel to the electric vector of the incident energy.

The relative orientation of the sheets in a given S-lens arrangement in accordance with the invention can be defined in terms of the relationship among an imaginary line moving in the S-sheet surface and always parallel to itself, termed the generator of each sheet, and the axes of an associated rectangular coordinate system.

In accordance with a first illustrative embodiment, the generator of the first S-sheet is parallel to the $x$ axis, which axis is itself parallel to the magnetic vector of an incident plane polarized wave propagating along axis $z$. The second and third lenses are identical S-sheets, one having a generator making a finite angle ($+\alpha$) degrees with the $y$ axis, the other making a finite angle ($-\alpha$) degrees with the $y$ axis.

In accordance with a second illustrative embodiment, the first S-sheet has a generator parallel to the $x$ axis, which again is parallel to the magnetic vector of incident plane polarized waves propagating along $z$. The second and third S-sheets have parallel generators which make an angle $\alpha$ with the $y$ axis, but the "S" shapes are opposite; that is, for $x>0$, the curvatures associated with the second and third S-sheets have opposite signs. The same relationship is true for $x<0$. Stated differently, for sinusoidally curved sheets there is a 180 degree phase difference between the curvatures of the second and third sheets for corresponding values of $x$.

The above and other objects of the present invention, together with its various features and advantages, can be more readily understood from reference to the accompanying drawing and to the detailed description thereof which follows:

Figure 1:
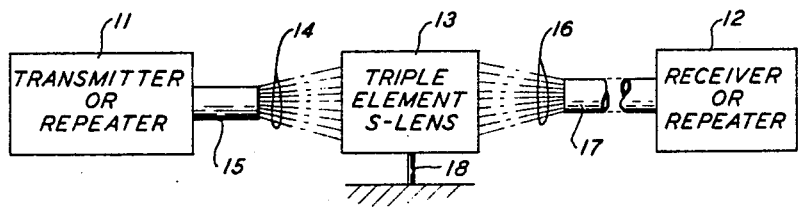
FIG. 1 is a diagrammatic representation of a long distance communication system for coherent optical frequency wave energy.

Referring more particularly to FIG. 1, an infrared, visible or ultraviolet communication system is illustrated in which stations 11, 12 can be either terminal points for the system or intermediate repeater stations therealong. In any event, stations 11, 12 typically are separated a distance of tens to hundreds of miles and the system is therefore a long distance system. Over such distances, diffraction effects associated with the transmission medium will cause the beam to diverge. Thus, if a convenient maximum beam radius is to be maintained, periodic refocusing of the energy will be necessary. Such refocusing means, indicated in FIG. 1 as S-lens 13, are interposed between adjacent stations and spaced at intervals determined by power level and transmission attenuation considerations. In FIG. 1, for example, element 13 serves to receive diverging rays 14 traveling through hollow cylindrical tube 15 and to refocus and to emit the received rays as converging rays 16 traveling through cylindrical tube 17. Tubes 15, 17 advantageously have a diameter sufficiently larger than the desired maximum diameter of the beams enclosed, thereby to have negligible influence, other than shielding, upon their propagation. The tubes can be evacuated, or they can be filled with an inert gas such as argon, maintained at a pressure for which scattering is unimportant. The propagation tubes and their associated lenses 13 can be disposed underground or above ground, as desired. Supporting platforms 18 are vibration free and are decoupled from their surroundings in the manner of seismographs and delicate galvanometers.

In a typical communication system, the S-lenses are spaced apart a distance approximately three times their focal length. Although only a single S-lens is illustrated in FIG. 1, tube 17 is shown broken to indicate the omission of similar refocusing lenses spaced at suitable intervals along the tens to hundreds of miles of the illustrated system. Thus, signal bearing optical information originating at station 11 is received at station 12, having been refocused as many as hundreds of times. In a similar manner energy originating at station 12 is multiply refocused and is ultimately received at station 11.

In accordance with the present invention, S-lens 13 comprises first, second and third S-sheets which are dielectric plates deformed into shapes approximating sinusoidal cylinders. A complete disclosure of a typical S-sheet focusing device appears in the above-mentioned conpending application of R. Kompfner, the disclosure of which is incorporated by reference herein. An understanding of the triple S-sheet lens embodiments in accordance with the invention can be more completely obtained from a consideration of FIGS. 2 through 4 of the drawing.

Figure 2:
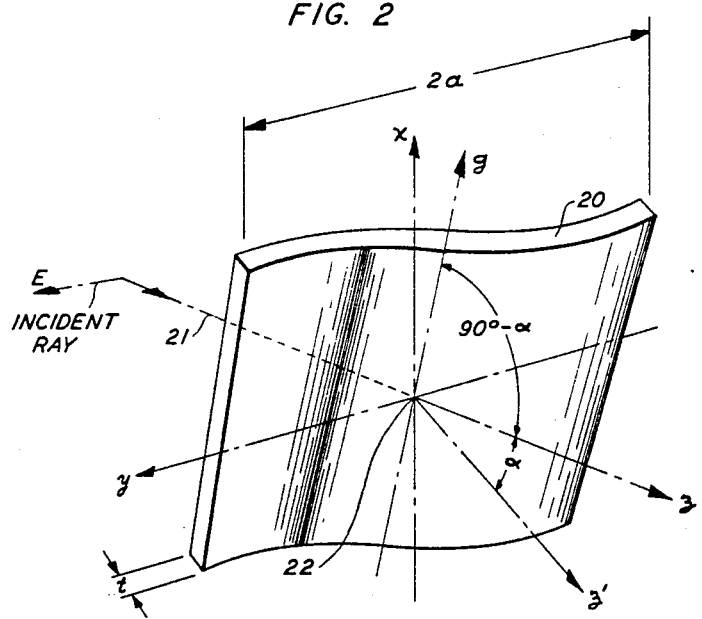
FIG. 2 is a perspective view of a generalized S-sheet given for purposes of explanation.

In FIG. 2 a typical S-sheet 20 is oriented in a rectangular coordinate system 22. Sheet 20 comprises signal energy-transparent dielectric material of optical quality such as quartz or optical glass, of which Corning No. 7056 is representative. Advantageously, the sheets have a thickness of the order order 10 mils, although thinner sheets are optically more attractive, with a concomitant reduction in mechanical strength. As stated before, sheet 20 is deformed into a sinusoidal or near sinusoidal shape which in FIG. 2 is mathematically described in the $g, y, z'$ coordinate system as $$z' = F(y) = A \sin \frac{2\pi}{\lambda}\left(y - \frac{\lambda}{2}\right) \quad (1)$$

for $y$ varying between $\lambda/4$ and $-\lambda/4$, where $\lambda$ is the wavelength of the sinusoidal variation and the values $\lambda/4$ and $-\lambda/4$ correspond to $+a$ and $-a$ respectively, thus making a total sheet width parallel to the $y$ axis of $2a$, or $\lambda/2$. The $g$ axis is parallel to and represents the generator of the warped surface. By coordinate rotation, the surface of sheet 20 can be redefined in the $x, y, z$ coordinate system as $$z = x \tan \alpha + \frac{F(y)}{\cos \alpha} \quad (2)$$

where $\alpha$ is the angle of rotation between the $z$ and $z'$ axes. An electromagnetic ray 21 propagates parallel to the $z$ axis with its electric vector parallel to the $y$ axis, and is incident at an angle $(90-\alpha)$ degrees with respect to the generator $g$. With the expression of Equation 2, the properties of sheet 20 can be defined through a complete ray tracing analysis. Optically, it is required that sheet 20 act as a positive cylindrical lens with a focal line parallel to the $x$ axis contained in the plane $y=0$. Stated differently, each incoming ray must, after passage through sheet 20, define a plane perpendicular to the $x$ axis and must cross the plane $y=0$ at a focal distance $f$ along the ray path beyond the sheet. Imposition of the above constraints produces the following mathematical system of two differential equations which defines the normal cross section of the surface sheet 20:

$$\frac{dp}{dy} \tan \alpha = 0$$

and $$\frac{y}{ft}\cos \alpha = -\frac{p}{(1+p^2)^{3/2}}\left[1 - \frac{1}{\sqrt{1+\frac{(n^2-1)(1+p^2)}{\cos^2 \alpha}}}\right]\frac{dp}{dy} \quad (3)$$

where $t$ is the sheet thickness, $n$ is the refractive index of the sheet material, and $p = dF(y)/dy$.

Figure 3:
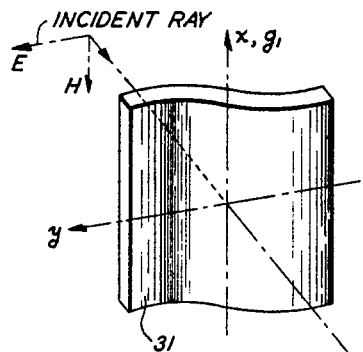
FIG. 3 illustrates a first triple element S-lens embodiment in accordance with the invention.
Figure 3:
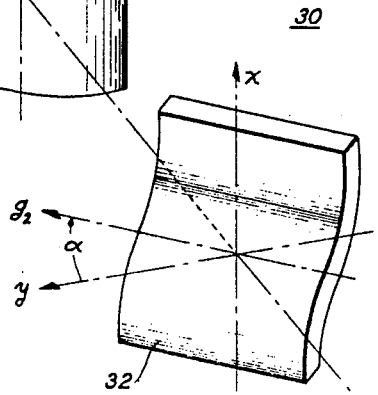
Figure 3:
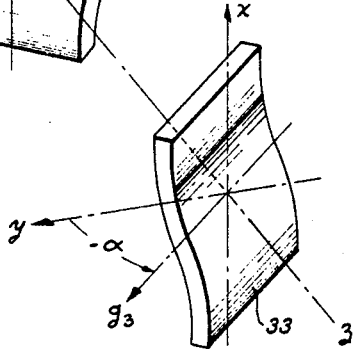
Figure 4:
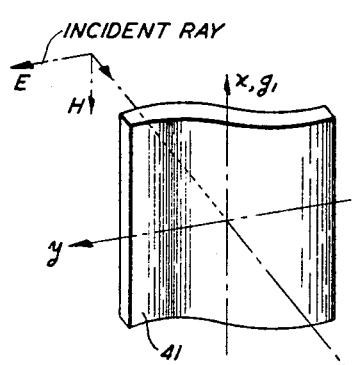
FIG. 4 illustrates a second triple element S-lens embodiment in accordance with the invention.
Figure 4:
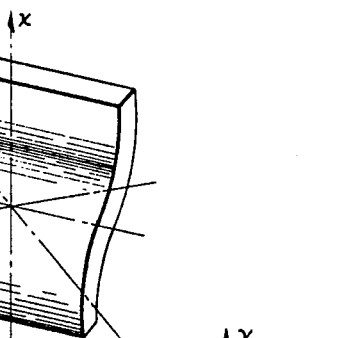
Figure 4:
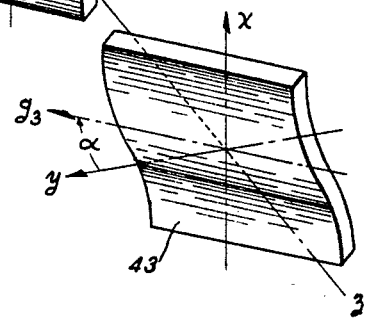

Equation 3 can be satisfied in three ways which, when the first solution is combined separately with the second and the third solutions, produce the point focus S-lens arrangements of FIGS. 3 and 4 in accordance with the invention.

It should be noted that the surface depicted in FIG. 2 is indicated to be sinusoidal. Such a curved S-sheet is characterized by extremely desirable focusing properties. However, a mathematical expression describing a slightly different surface curvature can be derived by integrating (3) and introducing the lens width limit of $2a$. The resultant expression is $$F(y) = \int_0^y p(y^2)dy = \int_0^y \sqrt{\left[\frac{1}{C}\frac{Ay^2+B}{1-(Ay^2+B)^2}\right]^2 - 1}\, dy \quad (4)$$

in which $$A = -\frac{\cos^2 \alpha}{2tf\sqrt{n^2-1}}$$

$$B = \frac{\sqrt{(n^2-1)(1+p_0^2)}}{\left[1+\sqrt{1+\frac{(n^2-1)(1+p_0^2)}{\cos^2 \alpha}}\right]\cos \alpha}$$

and $$C = \frac{\sqrt{n^2-1}}{2\cos \alpha}$$

Although the integration indicated in (4) cannot be performed in closed form, a practically usable expression for $F(y)$ can be obtained to any degree of accuracy by expanding the integrand in powers of $y^2$ and integrating term by term. When this is done, $$F(y) = yp(0) + \frac{y^3}{1!3}\frac{dp(0)}{dy^2} + \frac{y^5}{2!5}\frac{d^2p(0)}{(dy^2)^2} + \cdots \quad (5)$$

with $p$ and all derivatives taken at $y=0$. For purposes of the present disclosure however, the sinusodially warped sheet will be used as the basic component of the disclosed S-lenses, with the understanding that the more complex, substantially sinusodial form described in Equation 4 is intended also to be included.

In FIG. 3 an S-lens 30 comprising a first S-sheet 31, a second S-sheet 32, and a third S-sheet 33 is illustrated in perspective. Each of sheets 31–33 comprises optical materials as described with respect to FIG. 2. Sheet 31 corresponds to the simplest solution of Equation 3, for which $a=0$. Thus, the generator $g_1$ of sheet 31 is parallel to the $x$ axis. A second solution of Equation 3 consists of two identical S-sheets, the first oriented with an angle $\alpha$ between its generator and the $x$ axis, the second oriented with an angle $-\beta$ between generator and $x$ axis. Each solution of Equation 3 produces an S-sheet arrangement which focuses in a single plane. It is therefore necessary, in order to effect point focusing, to rotate one of the sheet configurations 90 degrees with respect to the other. In FIG. 3, in order to maintain a common $x, y, z$ coordinate system orientation for each of the three S-sheets of S-lens 30, an exchange of the $x$ and $y$ axes in the second solution of Equation 3 has been performed. Thus sheet 32, which has a curvature identical to that of sheet 31 although rotated 90 degrees, is oriented with an angle $\alpha$ between generator $g_2$ and the $y$ axis and sheet 33, physically identical to sheet 32, is oriented with an angle $-\alpha$ between generator $g_3$ and the $y$ axis. Sheets 31 through 33 are aligned along the common $z$ axis with a spacing between adjacent lenses negligible with respect to the focal lengths involved.

In order to reduce reflection losses in coherent plane polarized optical wave systems, it is now known that the orientation of dielectric interfaces between the propagating medium and an adjacent material is optimum when the tangent of the angle of incidence of waves upon the interface is approximately equal to the ratio of the refractive indices of the material and the medium. In the lens arrangement of FIG. 3 the angle $\alpha$ therefore advantageously satisfies the above relationship known as the Brewster angle condition. For slight deviations of $\alpha$ from the Brewster angle, reflection losses increase only slightly. Thus, precise orientation is not essential.

An additional embodiment of the invention is illustrated in FIG. 4 and S-lens 40 comprising a first S-sheet 41, a second S-sheet 42, and a third S-sheet 43, again comprising materials described with respect to FIG. 2. Sheet 41 is identical to sheet 31 of FIG. 3, and corresponds to the first soluton of Equation 3 for which $\alpha=0$. The third possible solution of Equation 3 is embodied in the combination of sheets 42, 43. Again assuming the 90 degree rotation of the S-sheets, represented mathematically by an interchange of $x$ and $y$ axes in the third solution of Equation 3, the sheets 42, 43 are seen to have parallel generators $g_2$, $g_3$ but opposite S-shapes. That is, the sinusodial undulation of sheet 43 along the $x$ axis is 180 degrees out of phase with the sinusodial undulation of sheet 42. Both sheets are oriented at a positive angle $\alpha$, the Brewster angle, with respect to the $z$ axis along which the incident ray propagates.

In the operation of the S-lenses of FIGS. 3 and 4, incident energy polarized parallel to the $y$ axis and incident upon the initial lens at the Brewster angle is focused thereby in the $yz$ plane. Upon passage through the second and third S-sheets which act together as a second lens focusing in the $xz$ plane, the incident energy is focused at a point on the $z$ axis which is hundreds to thousands of feet distant from the lens itself.

As a typical example, with $n=1.5$, $t=1.51$ millimeters, $f=1110$ meters, and the sheet aperture $2a=12$ centimeters, the transmission loss is approximately 0.01 db/kilometer for a 3400 meter spacing between triple element lenses. In practice, the aperture of illumination, $2a$, represents only a very small portion of the overall extent of the S-sheets. That is, the focusing elements are illuminated by the incident ray only over a relatively small region near $x=y=0$, thereby ensuring small deviations of the angle of incidence from the Brewster angle.

What is claimed is:
1. Focusing means for electromagnetic wave energy comprising,
   a first transparent dielectric sheet of constant thickness having first and second surfaces conforming to a portion of a substantially sinusoidal cylinder having a surface generator normal to a first plane,
   a second transparent dielectric sheet of constant thickness having first and second surfaces conforming to a portion of a substantially sinusoidal cylinder having a surface generator normal to a plane intersecting said first plane,
   and a third transparent dielectric sheet of constant thickness having first and second surfaces conforming to a portion of a substantially sinusoidal cylinder having a surface generator normal to a third plane intersecting said first plane,
   said first, second, and third sheets being disposed in the path of wave energy incident upon said first sheet,
   said sheets being spaced apart from one another along said path distances negligible with respect to the focal length of the focusing means.
2. Focusing means according to claim 1 in which said second and third planes are parallel.
3. Focusing means according to claim 1 in which said second and third planes intersect at an angle twice the Brewster angle.
4. A triple element S-lens having a focal length $f$ comprising in a rectangular coordinate system orientation,
   a first dielectric sheet of constant thickness having first and second surfaces of the form

$$z = A \sin \frac{2\pi}{\gamma} y$$

and second and third dielectric sheets of constant thickness having first and second surfaces of the form $$z = A \sin \frac{2\pi}{\lambda} x$$

rotated $|\alpha|$ degrees about the $x$ axis,
   said sheets being disposed successively along the $z$ axis with distances therebetween negligible with respect to $f$.
5. The lens according to claim 4 in which said second sheet is rotated $\alpha$ degrees about said axis in a first rotational sense and said third sheet is rotated $\alpha$ degrees about said axis in the rotational sense opposite from said first sense.
6. The lens according to claim 5 in which said sheets extend over a range of values of the sinusoidal operator between $\pi\beta/2$ and $3\pi\beta/2$ and are centered upon the $z$ axis.
7. In combination with the lens according to claim 6, means for illuminating said lens with electromagnetic wave energy in a direction parallel to the $z$ axis, said illumination being confined to a small region about $y=0$.
8. The lens according to claim 4 in which said second and third sheets are rotated $\alpha$ degrees about said axis in the same rotational sense.
9. The lens according to claim 8 in which said second sheet extends over a range of values of between $\pi\beta/2$ and $3\pi\beta/2$ and said third sheet and extends over a range of values of between $$-\frac{\pi\beta}{2} \text{ and } \frac{\pi\beta}{2}$$

said second and third sheets being centered upon the $z$ axis.
10. In combination with the lens according to claim 9, means for illuminating said lens with electromagnetic wave energy in a direction parallel to the $z$ axis, said illumination being confined to a small region about $y=0$.

References Cited by the Examiner
UNITED STATES PATENTS
3,224,331  12/1965  Kompfner.

JEWELL H. PEDERSEN, *Primary Examiner.*
JOHN K. CORBIN, *Examiner.*